March 7, 1961  M. HERVÉ  2,974,202
ELECTROSTATIC TRANSDUCERS
Filed Aug. 23, 1957
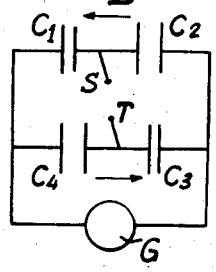
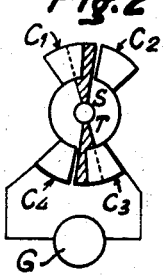
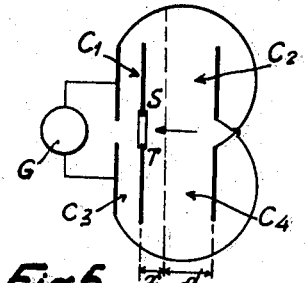
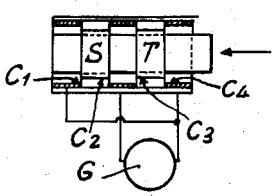
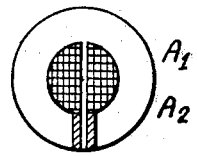
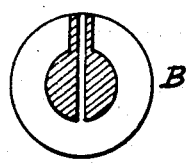
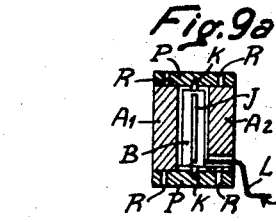
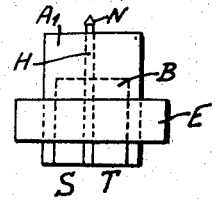
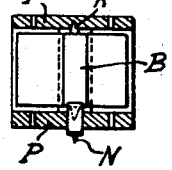
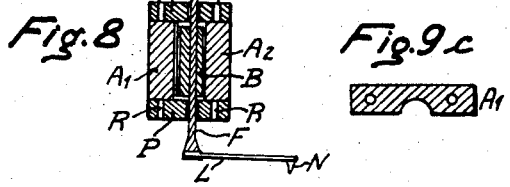
INVENTOR
Marcel Hervé
ATTORNEYS United States Patent Office 2,974,202
Patented Mar. 7, 1961

2,974,202
ELECTROSTATIC TRANSDUCERS
Marcel Hervé, 20 Rue Cujas, Paris V, France
Filed Aug. 23, 1957, Ser. No. 679,892
Claims priority, application France Aug. 30, 1956
14 Claims. (Cl. 179—100.41)

The present invention relates to an electrostatic symmetrical transducer, capable of providing an electric representation of a displacement, preferably a vibratory one.

Most of the transducers known at the present time utilize one condenser, the capacity variations of which, in relation with the phenomena studied, cause either frequency variations or amplitude variations of an electric current. Such devices, even when they are reliable, are not sensitive enough and are not easy to manufacture.

The present invention has for object to provide a transducer which overcomes these drawbacks.

According to the present invention, an electrostatic transducer essentially comprises four variable condensers so connected that they form a bridge adapted to be connected to a voltage generator; together with mechanical means adapted to transmit the movement to be electrically translated to the moving plates of the condensers, the electrical output voltage at the bridge terminals being the electric representation of the movement.

The voltage generator may be either an A.C. generator, of a frequency much higher than the frequency of the mechanical signal to be transformed, or a D.C. voltage generator.

In the former case the four condenser bridge acts like a ring modulator, and the signal avialable at the output terminals of the bridge will have to be demodulated, if necessary after a previous H.F. amplification, in order to deliver the desired modulation which is the electric image of the signal or of the mechanical displacement. In the latter case the modulation appears at the output terminals of the bridge.

In order that the invention may be more fully understood, reference will now be made to the accompany drawing in which:

Fig. 1 is an electric diagram of a four variable-condenser bridge according to the invention, Figs. 2, 3 and 4 show the same circuit as Fig. 1 but with condensers of different forms, Fig. 5 is the basic circuit diagram of a total feedback symmetrical amplifier.

Figs. 6a, 6b and 6c illustrate a microphone according to the invention,

Figs. 7a and 7b show one form of pick-up according to the invention,

Fig. 8 shows another pick-up construction, and

Figs. 9a to 9d show a further modified pick-up construction.

In Fig. 1, four variable condensers C1, C2, C3 and C4 are connected in the form of a bridge energized by a generator G, and the output terminals of the bridge are designated by S and T. The generator G may be either an A.C. or D.C. generator.

When the moving plates of the condensers are in the mid-position, that is when the capacities of the condensers are equal, the bridge is balanced and at rest, so that no output voltage appears at the terminals S and T. On the contrary, any displacement of the said plates with regard to their mid-position, for example as shown in Fig. 1 in which the direction of displacement is indicated by the arrows, causes a potential difference which appears between the said terminals.

If the displacement of the plates is correlated to a vibrational movement, the potential difference gives an electric representation of the movement. The figure shows how the condensers vary in capacity as a result of movement indicated by the arrows. C1 and C3 have increased in capacity whilst C2 and C4 have decreased.

The variable condensers may be of various types, for example: plane condensers in which the variable parameter is either an angular displacement between overlapping condenser plates as shown in Fig. 2 or a linear displacement as shown in Fig. 3.

The embodiment of Fig. 3 is particularly simple. The condensers are parallel plane plate condensers, and the fixed plates Y1, Y2, Y3, Y4, which are separated by a distance $2d$ from one another, are connected in pairs to the terminals of a voltage generator G, the fixed plate Y1 of condenser C1 being connected to the fixed plate Y4 of condenser C4 and the fixed plate Y2 of the condenser C2 being connected to the fixed plate Y3 of condenser C3, as shown in this figure. The connections are so arranged that the condensers C1 and C3 are on one side of the movable plates Z1, Z3 and the condensers C2 and C4 are formed on the other side of the movable plates. The movable plates Z1, Z3 move as a unit translationally between the fixed plates. The displacement $x$ of the movable plates, which are mechanically connected to the vibratory movement which is to be measured, regulates the voltage available between the output terminals S and T. The variable parameter in this case is thus the displacement of the movable plate assembly with reference to its mid-position. A resilient device, such as a torsion spring or a blade spring (not shown), is provided to bring back the movable plates to their mid-position.

Alternatively, cylindrical condensers may be used, as shown in Fig. 4, consisting of metal plates carried by insulating cylinders arranged to slide one within the other, whereby an axial displacement of the inner cylinder provides the variable parameter.

The electrical transducer according to the invention is capable of delivering a relatively high voltage, provided that the input impedance of the associated receiver be of a very high value.

For instance it is possible to use as an impedance matching amplifier a symmetrical total feedback amplifier of a conventional type, a diagram of which is shown in Fig. 5. The output of the amplifier is taken from terminals U and V.

The symmetrical electrostatic transducer according to the present invention may be particularly used as the main element of a microphone or pick-up assembly.

Fig. 6 shows a construction of microphone employing the principle shown in Fig. 3. It consists of a casing D containing two rigid plates A1 and A2 (Fig. 6b) of steatite or another insulating material, which are provided with small holes or with narrow slits and carry at their central part the two sets of fixed condenser plates. Between the fixed plates is arranged a flexible non-conducting plate B (Fig. 6c) made from mica for instance, which is the vibrating membrane carrying the movable plates. The holes in the fixed plates represent the mechanical connection between the vibratory movement to be recorded, the acoustic waves and the movable plates.

Let it be supposed that the distance ($2d$) between the fixed plates A1 and A2 be 100 microns and that the voltage U of the electric generator be 100 volts then the output voltage $u$ could rise to:

$$u = \frac{Ux}{d} = 2 \text{ volts}$$

per micron of $x$ displacement of the membrane B.

Fig. 7 shows a construction of pick-up in which two rigid plates A1 and A2, set in the fixed block E of insulating material, carry the fixed plates of the condensers, and a flexible plate B also set in the block E carries the movable plates. This flexible plate B is connected to the pick-up needle or stylus N by a flexible rod H, which bends according to the formation of the groove in the record that the needle or stylus is following.

Fig. 8 shows another construction of pick-up in which the vibrator movement from needle or stylus N is transmitted through arm L to the movable plates, carried by cylinder B, by torsion of the rod F to which cylinder B is fixed. The two rigid plates A1, A2 which carry the four fixed plates of the condensers are secured between two insulating end plates P by an adhesive or by means of screws or rivets R.

Figs. 9a to 9d show a modification of the pick-up construction in Fig. 8, in which the torsion bar F is replaced by a spindle J which carries movable cylinder B and is pivoted at K. The arm L carrying the stylus N passes through an aperture in plate A2. A spiral restoring spring M (Fig. 9d) is also provided.

It will be understood that the present invention has only been described and illustrated by way of example and that various modifications may be made without departing from the scope of the invention as defined in the appended claims.

I claim:

1. An electrostatic transducer comprising four parallel plate condensers arranged in a bridge circuit, each condenser having one fixed plate and one movable plate, and the movable plates being arranged for simultaneous angular displacement relative to the fixed plates, input and output terminals to said bridge circuit, means for connecting a voltage source to the input terminals of said bridge circuit, means for applying mechanical movement to the movable plate of each condenser, and means for deriving an electrical voltage from the output terminals of the bridged circuit depending upon the mechancal movement applied to the movable plates.

2. An electrostatic transducer comprising four parallel plate condensers arranged in a bridge circuit, said bridge circuit consisting of two pairs of condensers, each pair having two parallel fixed plates between which is arranged a movable plate common to both condensers of the pair, said movable plates being arranged for simultaneous translational displacement relative to the fixed plates, input and output terminals to said bridge circuit, means for connecting a voltage source to the input terminals of said bridge circuit, means for applying mechanical movement to the movable plates, and means for deriving an electrical voltage from the output terminals of the bridge circuit depending upon the mechanical movement applied to the movable plates.

3. An electrostatic microphone comprising a casing, two rigid substantially circular-apertured members mounted within the casing in parallel spaced relationship, each of said members carrying the fixed plates of two condensers, a substantially circular flexible member of insulating material arranged between the fixed members and carrying two movable condenser plates, said fixed and movable condsener plates forming four condensers arranged in a bridge circuit, means for applying a voltage to the microphone and means for producing an output voltage in dependence upon mechanical vibration transmitted to the flexible member in the form of acoustic waves through said apertures.

4. An electrostatic pick-up, comprising two rigid members of insulating material carrying the fixed plates of four condensers, a movable member mounted between the fixed members carrying the movable plates of the four condensers and arranged for angular displacement relative to the fixed plates, said condensers being arranged in a bridge circuit, a torsion rod, supporting said movable member for angular displacement relative to the fixed plates, and a stylus carried by said movable member.

5. An electrostatic pick-up, comprising two rigid members of insulating material carrying the fixed plates of four condensers, a movable member mounted between the fixed members carrying the movable plates of the four condensers and arranged for angular displacement relative to the fixed plates, said condensers being arranged in a bridge circuit, pivot means supporting said movable member for angular displacement relative to the fixed plates, means for restoring said movable member to its rest position, and a stylus carried by said movable member.

6. An electrostatic pick-up comprising two rigid members of insulating material carrying the fixed plates of four condensers, a movable member mounted between the fixed members carrying the movable plates of the four of condensers and arranged for displacement relative to the fixed plates, said condensers being arranged in a bridge circuit, and a stylus carried by said movable member.

7. An electrostatic pick-up comprising two rigid members of insulating or conducting material carrying the fixed plates of two pairs of condensers, a movable member mounted between the fixed members carrying the movable plates of two pairs of condensers and arranged for displacement relative to the fixed plates, said condenser plates forming four condensers arranged in a bridge circuit, and a stylus carried by said arm.

8. An electrostatic transducer comprising four variable condensers arranged in a bridge circuit, each condenser having a fixed plate and a movable plate, and said bridge circuit being balanced when all four condensers have the same value of capacity, means interconnecting the movable plates of said condensers so that upon movement of said plates the capacity value of two of said condensers increases by similar amounts to each other as the capacity value of the other two of said condensers decreases by similar amounts to each other, means for connecting a voltage source to said bridge circuit and means for deriving an electrical output voltage from the bridge circuit which is proportional to the movement of the movable plates from the balanced condition of said bridge circuit.

9. A transducer as claimed in claim 8, in which the four variable condensers comprise two pairs of condensers, each pair consisting of two parallel fixed plates and a movable plate arranged between said two parallel fixed plates and common to both condensers of the pair.

10. An electrostatic transducer as claimed in claim 8, comprising a cylinder of insulating material a plurality of metal rings deposited on the internal surface of said cylinder and forming the fixed plates of said condensers, a second cylinder of insulating material movable coaxially within said first cylinder of insulating material, a plurality of metal rings on the external surface of said second cylinder and constituting the movable plates of said condensers, means for making electrical connection to said fixed and movable plates and means for transmitting a movement to said second cylinder.

11. An electrostatic transducer comprising four variable condensers arranged in a bridge circuit each condenser having a fixed plate and a movable plate, and said bridge circuit being balanced when all four condensers have the same value of capacity, means interconnecting the movable plates of said condensers so that upon movement of said plates the capacity value of two of said condensers increases by similar amounts to each other as the capacity value of the other two of said condensers decreases by similar amounts to each other, means for connecting a voltage source to the fixed plates of the condensers of said bridge circuit, means for applying movement to the movable plates of said condensers so that said movable plates move equally and symmetrically to each other and means for deriving an electrical output voltage from the movable plates of said condensers which is proportional to the movement of the movable plates from the balanced condition of said bridge circuit.

12. A transducer as claimed in claim 11, including a direct current voltage source adapted to be connected to said bridge circuit.

13. A transducer as claimed in claim 11, including an alternating current voltage source adapted to be connected to said bridge circuit.

14. An electrostatic transducer comprising four variable condensers arranged in a bridge circuit, each condenser having a fixed plate and a movable plate and said bridge circuit being balanced when all four condensers have the same value of capacity, means interconnecting the movable plates of said four condensers so that upon movement of said plates the capacity value of two of said condensers increases by similar amounts to each other as the capacity value of the other two of said condensers decerases by similar amounts to each other, means for connecting a voltage source to said bridge circuit, means for applying movement to the movable plates of said condensers so that said movable plates move equally and symmetrically to each other, means for restoring said movable plates to a rest position in which said bridge circuit is balanced, and means for deriving an electrical output voltage from the bridge circuit which is proportional to the movement of the movable plates from the balanced condition of said bridge circuit.

References Cited in the file of this patent

UNITED STATES PATENTS 1,978,200   Heising _____ Oct. 23, 1934